(12) United States Patent
Zhang et al.

(10) Patent No.: US 11,723,000 B2
(45) Date of Patent: **\*Aug. 8, 2023**

(54) METHOD AND EQUIPMENT FOR DETERMINING TRANSMITTING RESOURCES IN V2X COMMUNICATION

(71) Applicant: Samsung Electronics Co., Ltd., Suwon-si (KR)

(72) Inventors: Shichang Zhang, Beijing (CN); Yingyang Li, Beijing (CN); Yi Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/164,046

(22) Filed: Feb. 1, 2021

(65) Prior Publication Data

US 2021/0153198 A1 May 20, 2021

Related U.S. Application Data (63) Continuation of application No. 16/786,162, filed on Feb. 10, 2020, now Pat. No. 10,912,087, which is a
(Continued)

(30) Foreign Application Priority Data

Sep. 30, 2016 (CN) .......................... 201610875441.5
Oct. 13, 2016 (CN) .......................... 201610895260.9
(Continued)

(51) Int. Cl.
*H04W 72/10* (2009.01)
*H04W 72/0446* (2023.01)
(Continued)

(52) U.S. Cl.
CPC ........... *H04W 72/0446* (2013.01); *H04L 5/00* (2013.01); *H04W 72/02* (2013.01); *H04W 72/23* (2023.01);
(Continued)

(58) Field of Classification Search
CPC ...... H04L 5/00; H04W 72/02; H04W 72/042; H04W 72/10; H04W 72/0446; B60W 2550/40
See application file for complete search history.

(56) References Cited

U.S. PATENT DOCUMENTS

2014/0328329 A1 11/2014 Novlan et al.
2016/0094430 A1 3/2016 Sella et al.
(Continued)

FOREIGN PATENT DOCUMENTS

CN 101834692 A 9/2010
CN 105517168 A 4/2016
(Continued)

OTHER PUBLICATIONS

Samsung: "Remaining details on resource pool configuration", 3GPP Draft; R1-1608992, Oct. 9, 2016 (Oct. 9, 2016), XP051149045.
(Continued)

*Primary Examiner* — Sam Bhattacharya
(74) *Attorney, Agent, or Firm* — Jefferson IP Law, LLP (57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). A method for determining transmitting resources in vehicle to vehicle/pedestrian/infrastructure/network (V2X) communication is provided. The method includes determining, by a user equipment (UE), a set $\{t_i\}$ consisting of configurable V2X subframes within one sys-
(Continued)

tem frame period, by the UE, determining information about a bitmap for configuring a resource pool, determining, in the set $\{t_i\}$, subframes belonging to the resource pool, by the UE, selecting, after resource reselection, the position of a resource for initial transmission, determining, in the resource pool, the subframe position of the reserved resource according to a resource reservation subframe interval Prsv and the number of resource reservations, readjusting the position of the reserved resource when a certain condition is satisfied, and transmitting, by the UE, a physical sidelink shared channel (PSSCH) on the determined resource for initial transmission and the reserved resource.

12 Claims, 4 Drawing Sheets

Related U.S. Application Data continuation of application No. 15/721,005, filed on Sep. 29, 2017, now Pat. No. 10,560,937.

(30) Foreign Application Priority Data

| | | |
|---|---|---|
| Mar. 17, 2017 | (CN) | 201710161151.9 |
| Mar. 24, 2017 | (CN) | 201710182812.6 |

(51) Int. Cl.
| | |
|---|---|
| *H04L 5/00* | (2006.01) |
| *H04W 72/02* | (2009.01) |
| *H04W 72/23* | (2023.01) |
| *H04W 72/56* | (2023.01) |

(52) U.S. Cl.
CPC ........ *H04W 72/56* (2023.01); *B60W 2556/45* (2020.02)

(56) References Cited

U.S. PATENT DOCUMENTS

| | | | |
|---|---|---|---|
| 2017/0367059 A1 | 12/2017 | Park et al. | |
| 2019/0090250 A1 | 3/2019 | Lee et al. | |

FOREIGN PATENT DOCUMENTS

| | | |
|---|---|---|
| EP | 2 991 428 A1 | 3/2016 |
| EP | 3 468 268 A1 | 4/2019 |
| EP | 3499994 A1 | 6/2019 |
| KR | 2014-0054673 A | 5/2014 |
| WO | 2016-108456 A1 | 7/2016 |
| WO | 2017-052078 A1 | 3/2017 |

OTHER PUBLICATIONS

LG Electronics: "Summary of Wednesday V2V offline discussions", 3GPP Draft; R1-168247, Aug. 28, 2016 (Aug. 28, 2016), XP051133264.
LG Electronics, 3GPP "R1-166826 Resource selection details for UE, autonomous resource selection mode m PC5-based V2V", Aug. 22-26, 2016.
European Office Action dated Jul. 23, 2021, issued in European Office Action 17856866.3.
Chinese Office Action dated Aug. 31, 2021, issued in Chinese Office Application No. 201710182812.6.
LG Electronics: "Support for V2V services based on LTE sidelink", 3GPP Draft; RP-161602 V2V SR for RAN_73, 3rd Generation Partnership Project (3GPP), Mobile Competence Centre; 650, Route Des Lucioles ; F-06921 Sophia-Antipolis Cedex; France, vol. TSG RAN, No. New Orleans, USA; Sep. 19, 2016-Sep. 22, 2016, XP051661820, Sep. 13, 2016.
LG Electronics: "Remaining issues for resource pool configuration", 3GPP Draft; R1-166829 Remaining Issues for Resource Pool Configuration, 3rd Generation Partnership Project (3GPP), Mobile Competence Centre ; 650, Route Des Lucioles ; F-06921 Sophia-Antipolis Cedex; France, vol. RAN WG1, no. Gothenburg, Sweden; Aug. 22, 2016-Aug. 26, 2016, XP051140403, Aug. 21, 2016.
Samsung: "SA design for V2V", 3GPP Draft; R1-162680 SA_Final, 3rd Generation Partnership Project (3GPP), Mobile Competence Centre ; 650, Route Des Lucioles; F-06921 Sophia-Antipolis Cedex ; France, vol. RAN WG1, no. Busan, Korea; Apr. 11, 2016-Apr. 15, 2016, XP051080344, Apr. 2, 2016.
European Search Report dated Mar. 11, 2020, issued in European Application No. 17856866.3-1215.
Samsung, 'Remaining details on resource pool configuration', 3GPP TSG RAN WG1 #87, R1-1612394, Nov. 14-18, 2016.
Ericsson, 'Pool design for V2V', R1-166974, 3GPP TSG RAN WG1 #86, Goteborg, Sweden, Aug. 12, 2016.
Intel Corporation, 'On timing relationship between sensing window, packet arrival, resource reselection trigger, PSCCH and PSSCH transmissions', R1-166513, 3GPP TSG RAN WG1 #86, Goteborg, Sweden, Aug. 13, 2016.
NTT Docomo, Inc., 'Further details of UE autonomous resource (re)selection for V2V', R1-167355, 3GPP TSG RAN WG1 #86, Goteborg, Sweden, Aug. 12, 2016.
Ericsson, 'Scheduling over PC5', R1-167010, 3GPP TSG RAN WG1 #86, Goteborg, Sweden, Aug. 12, 2016.
Indian Office Action dated Dec. 2, 2021, issued in Indian Application No. 201937011015.
European Office action dated Jan. 28, 2022, issued in European Application No. 17 856 866.3.
Korean Notice of Allowance dated Jun. 30, 2022, issued in Korean Application No. 10-2019-7007963.
Ericsson, "WF on pools for V2X," 3GPP TSG RAN WG1 #86, R1-168082, Aug. 22-26, 2016, Gothenburg, Sweden.
Session Chairman (Nokia), "Chairman's Notes of Agenda Item 7.2.2 on Support for V2V services based on LTE sidelink," 3GPP TSG RAN WG1 #86, R1-168403, Gothenburg, Sweden, Aug. 22-26, 2016.
Korean Office Action dated Mar. 18, 2022, issued in Korean Application No. 10-2019-7007963.

METHOD AND EQUIPMENT FOR DETERMINING TRANSMITTING RESOURCES IN V2X COMMUNICATION

CROSS-REFERENCE TO RELATED APPLICATION(S)

This application is a continuation application of prior application Ser. No. 16/786,162, filed on Feb. 10, 2020, which has issued as U.S. Pat. No. 10,912,087 on Feb. 2, 2021 and is a continuation application of prior application Ser. No. 15/721,005, filed on Sep. 29, 2017, which has issued as U.S. Pat. No. 10,560,937 on Feb. 11, 2020 and was based on and claimed priority under 35 U.S.C § 119(a) a Chinese patent application filed on Sep. 30, 2016 in the State Intellectual Property Office of the People's Republic of China and assigned Serial number 201610875441.5, of a Chinese patent application filed on Oct. 13, 2016 in the State Intellectual Property Office of the People's Republic of China and assigned Serial number 201610895260.9, of a Chinese patent application filed on Mar. 17, 2017 in the State Intellectual Property Office of the People's Republic of China and assigned Serial number 201710161151.9, and of a Chinese patent application filed on Mar. 24, 2017 in the State Intellectual Property Office of the People's Republic of China and assigned Serial number 201710182812.6 the entire disclosure of each of which is hereby incorporated by reference.

TECHNICAL FIELD

The present disclosure relates to the technical field of mobile communications. More particularly, the present disclosure relates to a method and equipment for determining transmitting resources in vehicle to vehicle/pedestrian/infrastructure/network (V2X) communication.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Due to its great potential value in the public security field and the ordinary civil communication field, the device to device (D2D) communication technology has been standardized in the 3rd generation partnership project (3GPP). In the 3GPP standard, the direct communication link between devices is referred as a sidelink, which is similar to an uplink and a downlink. A control channel and a data channel exit on the sideline, which are referred as a physical sidelink control channel (PSCCH) and a physical sidelink shared channel (PSSCH), respectively. The PSCCH is used to indicate information, such as the location of time-frequency domain resources for PSSCH transmission, the modulation and coding scheme, and the receiving destination ID for the PSSCH. The PSSCH is used for bearing data.

Since the standardized D2D communication in the 3GPP is mainly specific to low-speed terminals, as well as services having lower requirements on the time delay sensitivity and receiving reliability, the realized D2D functions are far unable to meet the user demands. Accordingly, based on the current D2D broadcast communication mechanism, the 3GPP further realizes the standardization of some functions of low-delay and high-reliability direct communications between high-speed equipment's, between a high-speed equipment and a low-speed equipment and between a high-speed equipment and a static equipment (i.e., vehicle to vehicle/pedestrian/infrastructure/network (V2X)). Therefore, the sidelink communication in the 3GPP at present comprises two different modes: D2D and V2X.

In the present standardized V2X system, the PSCCH and the PSSCH are transmitted within their respective resource pools, wherein the resource pool is determined by a set of subframes and a set of same physical resource blocks (PRBs) on each subframe belonging to the resource pool. In addition, the PSCCH resource pools and the PSSCH resource pools are one-to-one bound to each other. For example, the PSSCH resources indicated by a PSCCH transmitted within a PSCCH resource pool belong to a PSSCH resource pool bound to this PSCCH resource pool. In the present V2X, the bounding PSCCH resource pool and PSSCH resource pool are determined by a same bitmap, and the sets of PRBs contained in the two resource pools can be overlapped.

Bits in a bitmap for configuring a set of subframes in the resource pool may be mapped onto only a part of subframes. For example, if a sidelink synchronization signal (SLSS) transmission subframe is configured on a current carrier in which the V2X runs, the SLSS subframe should be skipped during the mapping of the bitmap to the subframes. Hereinafter, subframes capable of mapping with bits in a bitmap are referred as configurable V2X subframes. A set of configurable V2X subframes within one system frame period (i.e., 10240 subframes) is denoted by $\{t_i\}$, where $0 \leq t_i < 10240$, indicating the actual subframe number of a configurable V2X subframe within the system frame period; $0 \leq i < M$, indicating a relative number of the configurable V2X subframe $t_i$ in the set $\{t_i\}$; and M denotes the total number of configurable V2X subframes within one system. It is assumed that the length of a bitmap for configuring a resource pool is B, then for any subframe $t_j$ in the set $\{t_i\}$, if the $(\mathrm{mod}(j, B))^{th}$ bit in the bitmap is 1, it is indicated that the subframe $t_j$ belongs to the resource pool configured by the bitmap, where mod(·) denotes a modulo operation, and the index of the bitmap starts from 0. In the current standardized V2X system, the length of a bitmap for configuring a resource pool can be 16, 20 or 100.

Since the V2X communication services have natural periodicity, a semi-static resource occupation mechanism is introduced into the current standardized V2X system. According to this mechanism, if a user equipment (UE) (a UE performing V2X communication, similarly hereinafter) schedules a PSSCH frequency domain resource on a subframe $t_n$ for the transmission of a current transmission block (TB) through a PSCCH, the UE can reserve a same frequency domain resource on a subframe $t_{n+Prsv}$ for the transmission of the next TB through this PSCCH, wherein Prsv is the resource reservation subframe interval, the value of which is indicated by a specified bit in the PSCCH and is an integral multiple of Pm, wherein Pm is the granularity of the resource reservation subframe interval currently configured by the system, for example, the Pm is equal to 100. This mechanism proposes certain requirements on the distribution of subframes within the PSSCH resource pool. For example, if the subframe to belongs to the PSSCH resource pool for the current transmission by the UE, the subframe $t_{n+Prsv}$ should also belong to this PSSCH resource pool, or otherwise the UE is unable to transmit the PSSCH on the reserved subframe.

Since, in scenarios for the current standardized V2X system, the V2X communication can occupy all subframes in the set $\{t_i\}$, all bits in the bitmap for configuring a resource pool can be 1. Thus, the requirements on the distribution of subframes in the resource pool as described above can be satisfied. However, in the subsequent enhanced V2X versions, the V2X communication may share a same carrier with other types of communications, for example, the V2X communication and the uplink communication can be multiplexed on a same carrier by time division. In order to ensure the performance of two or more types of communications, it is unable to use all configurable V2X subframes for V2X communication. In this case, if the length of a bitmap for configuring the PSSCH resource pool is not a divisor or multiple of Pm, for example, when the length is 16, it is unable to satisfy the requirements on the distribution of subframes in the resource pool within the same system frame period. And, if the length of the bitmap is not a divisor of M, for example, when M=10176 and when the length of the bitmap is 16, 20 or 100, within different system frame periods, the distribution of subframes in the resource pool will change, and it is thus unable to satisfy the requirements on the distribution of subframes in the resource pool.

It can be known from the above analysis that, if the V2X communication shares a same carrier with other types of communications, since the V2X communication is unable to use all configurable V2X subframes, within both a same system frame period and different system frame periods, the distribution of subframes in the resource pool may be unable to satisfy requirements on the reservation of resources in the V2X communication. However, there has been no ideal technical solution on how to address this issue.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and equipment for determining transmitting resources in V2X communication.

In accordance with an aspect of the present disclosure, a user equipment (UE) determines a set $\{t_i\}$ of configurable V2X subframes within one system frame period, determines information about a bitmap for configuring a resource pool, and determines, in the set $\{t_i\}$, subframes belonging to the resource pool, selects, after resource reselection, the position of a resource for initial transmission, determines, in the resource pool, the subframe position of the reserved resource according to a resource reservation subframe interval Prsv and the number of resource reservations, readjusts the position of the reserved resource when a certain condition is satisfied, and transmits a physical sidelink shared channel (PSSCH) on the determined resource for initial transmission and the reserved resource.

In an implementation, when determining the set $\{t_i\}$, the UE can first exclude a part of subframes within the system frame period in one of the following five methods to determine a set $\{i'\}$:

Procedure 1: excluding subframes configured for sidelink synchronization signal (SLSS) transmission within the system frame period, and further excluding time division duplexing (TDD) downlink subframes and special subframes on a TDD carrier, Procedure 2: excluding subframes configured for SLSS transmission and subframes configured for cell-specific sound reference signal (SRS) transmission within the system frame period, and further excluding TDD downlink subframes and special subframes on a TDD carrier, Procedure 3: excluding subframes configured for SLSS transmission, subframes configured for cell-specific SRS transmission and subframes configured for physical random access channel (PRACH) transmission within the system frame period, and further excluding TDD downlink subframes and special subframes on a TDD carrier, Procedure 4: excluding subframes configured for SLSS transmission, subframes configured for cell-specific SRS transmission and subframes reserved for physical uplink shared channel (PUSCH) transmission within the system frame period, and further excluding TDD downlink subframes and special subframes on a TDD carrier, and Procedure 5: excluding subframes configured for SLSS transmission, subframes configured for cell-specific SRS transmission, subframes configured for PRACH transmission and subframes reserved for PUSCH transmission within the system frame period, and further excluding TDD downlink subframes and special subframes on a TDD carrier.

In an implementation, the set $\{t_i\}$ of configurable V2X subframes within one system frame period consists of subframes, within one system frame period, other than subframes for SLSS transmission and downlink subframes on a TDD carrier.

In an implementation, the UE further excludes subframes having an index value of $\delta+j\times\Delta$ in the set $\{i'\}$, where M' is the size of the set $\{i'\}$, and $j=0, 1, 2, \ldots, \text{Mod}(M', B)-1$, $\Delta=\lfloor M'/\text{mod}(M', B)\rfloor$, $0\leq\delta<\lfloor M'/\text{mod}(M', B)\rfloor$, and a specific value is configured by an evolved Node B (eNB), preconfigured or defined by the standard, and, B is the length of the bitmap for configuring the resource pool.

In an implementation, first B-mod(M, B) bits of the bitmap for configuring the resource pool determined by the UE should be the same as last B-mod(M,B) bits of this bitmap, where B is the length of the bitmap for configuring the resource pool and M is the number of elements in the set $\{t_i\}$.

In an implementation, within each system frame period, the UE maps the bitmap for configuring the resource pool onto subframes belonging to the set $\{t_i\}$ within this system frame period according to a special bitmap mapping offset $\Delta_t$ of this system frame.

In an implementation, at a moment t, mapping, starting from the $(\Delta_t)^{th}$ bit, the bitmap onto subframes belonging to the set $\{t_i\}$ within the system frame, where t denotes the universal time coordinated (UTC) of the current moment, $\Delta_t=\text{mod}(\lfloor(t-T_{ref})/10.24\rfloor\times M, B)$, and $\Delta_t$ is a bitmap mapping offset used by the current system frame period, and, $T_{ref}$ denotes a particular UTC reference time point.

In an implementation, for any subframe $t_j$ in the set $\{t_i\}$, if the $(\text{mod}(j+\Delta_t, B))^{th}$ bit of the bitmap is 1, it is indicated that subframe $t_j$ belongs to a resource pool configured by the bitmap.

In an implementation, $T_{ref}$ is greenwich mean time (GMT) 00:00:00 on Jan. 1, 1900, or configured by an eNB.

In an implementation, the UE acquires the bitmap mapping offset $\Delta$ used by the current system frame by receiving a broadcast message from an eNB or a physical sideline broadcast channel (PSBCH) transmitted by a reference synchronization source UE, and, at the UTC time t, the UE maps, starting from the $(\tilde{\Delta}_t)^{th}$ bit, the bitmap onto subframes belonging to the set $\{t_i\}$ within the system frame, where $\tilde{\Delta}_t=\text{mod}(\text{mod}\lfloor(t-\tilde{T}_{ref})/10.24\rfloor\times M, B)+\Delta, B)$, $\tilde{T}_{ref}$ denotes the UTC time when the UE receives a signaling indicative of the bitmap mapping offset by a synchronization source the last time, and $\Delta$ is the bitmap mapping offset indicated by the synchronization source received by the UE the last time.

In an implementation, the value of resource reservation subframe interval granularity Pm used by the UE is an integer, closest to 100, which can be exactly divided by B.

In an implementation, the UE determines a value of Pm according to the size M of the set $\{t_i\}$, i.e., $Pm=100\times\lceil M/10240\rceil$ or $Pm=100\times\lfloor M/10240\rfloor$, or, $Pm=100\times\lceil(\text{the number of uplink subframes within one system frame}-X)/10\rceil$ or $Pm=100\times\lfloor(\text{the number of uplink subframes within one system frame}-X)/10\rfloor$.

If the subframes within the system frame period are excluded in the procedure 1, X=0, if the subframes within the system frame period are excluded in the procedure 2, X is the number of subframes configured for cell-specific SRS transmission within the system frame, if the subframes within the system frame period are excluded in the procedure 3, X is the number of subframes configured for cell-specific SRS transmission and PRACH transmission within the system frame, if the subframes within the system frame period are excluded in the procedure 4, X is the total number of subframes configured for cell-specific SRS transmission and subframes reserved for PUSCH transmission within the system frame, and, if the subframes within the system frame period are excluded in the procedure 5, X is the total number of subframes configured for cell-specific SRS transmission, subframes configured for PRACH transmission and subframes reserved for PUSCH transmission within the system frame.

In an implementation, if B=16, Pm=96, and, if B=20 or 100, Pm=100.

In an implementation, if a UE physical layer receives a PSSCH scheduling grant indicated by a UE higher layer, the PSSCH scheduling grant schedules a PSSCH frequency-domain resource sets on a subframe $t_n$ for current TB transmission, and the resource reservation subframe interval is Prsv, if the UE determines, according to the number of resource reservations indicated by the PSSCH scheduling grant, that a subframe m for the $j^{th}$ resource reservation does not belong to the resource pool determined in operation 220, or if only subframes for SLSS transmission are excluded from the set $\{t_i\}$ and the subframe m is a TDD downlink subframe or a subframe of other types unavailable for V2X transmission although the subframe m belongs to the resource pool determined in operation 220, the UE readjusts the subframe position of the reserved resource in one or more of the following three methods:

Procedure 1: the UE adjusts the position of the $j^{th}$ reserved resource to a first subframe belonging to the current resource pool after the subframe m, and regards a same frequency-domain resources set s on this subframe as an available PSSCH transmission resource, Procedure 2: the UE adjusts the position of the $j^{th}$ reserved resource to a first subframe belonging to the current resource pool before the subframe m, and regards a same frequency-domain resources set s on this subframe as an available PSSCH transmission resource, and Procedure 3: the UE randomly selects a subframe belonging to the current resource pool within a range of subframes [m+x,m+y], and regards a same frequency-domain resources set s on this subframe as an available PSSCH transmission resource, where all subframes within the range [m+x,m+y] belong to a same system frame period, and both x and y are integers.

In an implementation, if a subframe for a PSSCH transmission resource currently selected by the UE is a transmission interval, and an uplink data center interconnection (DCI) received by the UE indicates that the UE transmits a physical uplink shared channel (PUSCH) on this subframe, the UE preferentially transmits the PUSCH and gives up transmitting the PSSCH, and if a subframe for a PSSCH transmission resource currently selected by the UE is not a transmission interval, and an uplink DCI received by the UE indicates that the UE transmits a PUSCH on this subframe, the UE guarantees to transmit the PUSCH and gives up transmitting the PUSCH.

In accordance with another aspect of the present disclosure, an equipment for determining transmitting resources in vehicle to vehicle/pedestrian/infrastructure/network (V2X) communication is provided. The equipment includes a resource pool determination device configured to determine a set $\{t_i\}$ of configurable V2X subframes and determine subframes contained in a resource pool in the set $\{t_i\}$ according to a bitmap for configuring the resource pool, a reserved resource determination device configured to select, after resource reselection, the position of a resource for initial transmission, determine, in the resource pool, the subframe position of the reserved resource according to a resource reservation subframe interval Prsv and the number of resource reservations, and readjusts the position of the reserved resource when a certain condition is satisfied, and a PSSCH transmission device configured to transmit a PSSCH on the resource for initial transmission and the reserved resource.

In an embodiment of the present disclosure, a UE determines a set $\{t_i\}$ of configurable V2X subframes within one system frame period, determines information about a bitmap for configuring a resource pool, determines, in the set $\{t_i\}$, subframes belonging to the resource pool, selects, after resource reselection, the position of a resource for initial transmission, determines, in the resource pool, the subframe position of the reserved resource according to a resource reservation subframe interval Prsv and the number of resource reservations, readjusts the position of the reserved resource when a certain condition is satisfied, and transmits a physical sidelink shared channel (PSSCH) on the determined resource for initial transmission and the reserved resource. With a small standard alteration and a small increase in the implementation complexity, the method can improve the performance of the V2X communication.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

To make the objectives, technical solutions and advantages of the present application clearer, the present application will be further described below in details by various embodiments with reference to the accompanying drawings.

In the following description, unless otherwise stated, the subframe is a subframe in a set $\{t_i\}$, and the subframe interval or subframe repetition interval is an interval between subframes in the set $\{t_i\}$.

In the current standardized vehicle to vehicle/pedestrian/infrastructure/network (V2X) system, a transmitting user equipment (UE) will reserve transmitting resources for the next transmission block (TB) at a certain subframe interval (i.e., Prsv), and the Prsv is an integral multiple of Pm. And, in the current standardized V2X system, the length of a bitmap for configuring a resource pool can be 16, 20 or 100, and not all those values of the length are divisors of Pm and M. Therefore, it is difficult to ensure that the repetition interval between subframes in the resource pool configured by the bitmap is always Pm within one or more system frame periods, and eventually, the resource reserved for the subframe interval by the UE according to an integral multiple of Pm may fall into a subframe beyond the current resource pool, and in this case, the performance of the system is influenced. Therefore, the present application proposes a method for determining transmitting resources, as shown in FIG. 1.

Figure 1:
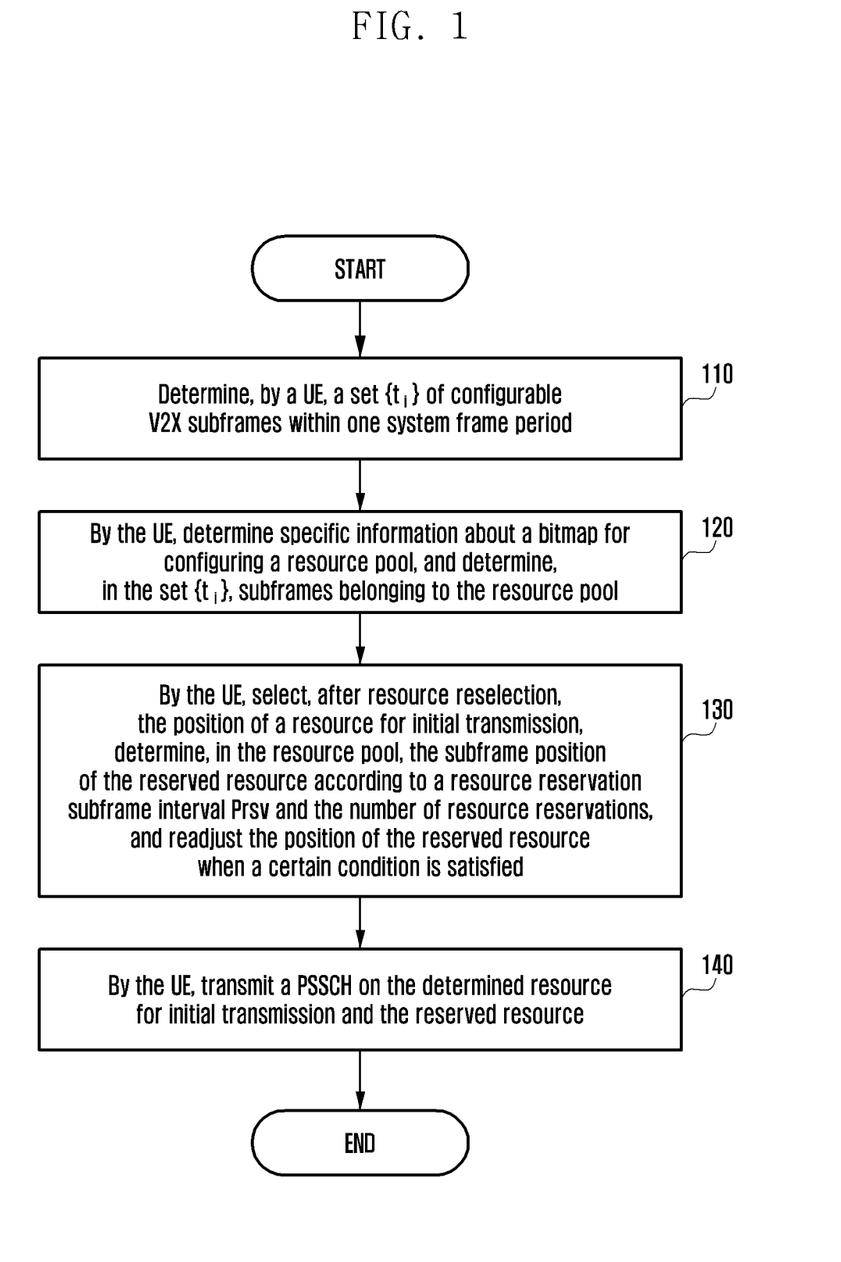
FIG. 1 is a flowchart of implementation operations according to an embodiment of the present disclosure.

FIG. 1 is a flowchart of implementation operations according to an embodiment of the present disclosure.

Referring to FIG. 1, in operation 110, a UE determines a set $\{t_i\}$ composed of configurable V2X subframes within one system frame period.

In an embodiment of the present disclosure, the UE determines the number of configurable V2X subframes according to the configuration of the current carrier, so as to determine the set $\{t_i\}$, the number of subframes in the set $\{t_i\}$ being denoted by M. Wherein, the type of subframes, in one system frame, not belonging to configurable V2X subframes is defined by the standard or configured by an evolved Node B (eNB). For example, subframes of this type can comprise subframes for sidelink synchronization signal (SLSS) transmission, downlink subframes on a time division duplexing (TDD) carrier, or more.

In operation 120, the UE determines specific information about a bitmap for configuring a resource pool, and determines, in the set $\{t_i\}$, subframes belonging to the resource pool.

In the present application, the UE determines specific information about a bitmap for configuring a resource pool according to the pre-configuration or a configuration signaling of the eNB. The specific information about the bitmap comprises the length B of the bitmap and the specific value of each bit in the bitmap. The procedure for the UE to determine a resource pool according to the bitmap and the set $\{t_i\}$ is the same as the procedure described in the Background.

In operation 130, the UE selects, after resource reselection, the position of a resource for initial transmission, determines, in the resource pool, the subframe position of the reserved resource according to a resource reservation subframe interval Prsv and the number of resource reservations, and readjusts the position of the reserved resource when a certain condition is satisfied.

The UE selects, after resource reselection, the position of a resource for initial transmission; then the UE physical layer determines each subframe position of the reserved resource according to the resource reservation subframe interval Prsv determined by the UE higher layer and the number of resource reservations; and if the subframe for a certain resource reserved at Prsv does not belong to the resource pool determined by the UE in operation 120, the UE readjusts this reserved resource to another subframe belonging to the current resource pool.

In operation 140, the UE transmits a physical sidelink shared channel (PSSCH) on the determined resource for initial transmission and on the reserved resource.

In the present application, if the UE needs to transmit both a PSSCH and an uplink channel on a certain subframe, the UE should transmit the channel with the highest priority in a certain priority order.

To understand the present application conveniently, the technical solutions of the present application will be further and specifically described below by specific application situations in an inter-equipment interaction mode.

Embodiment 1

Figure 2:
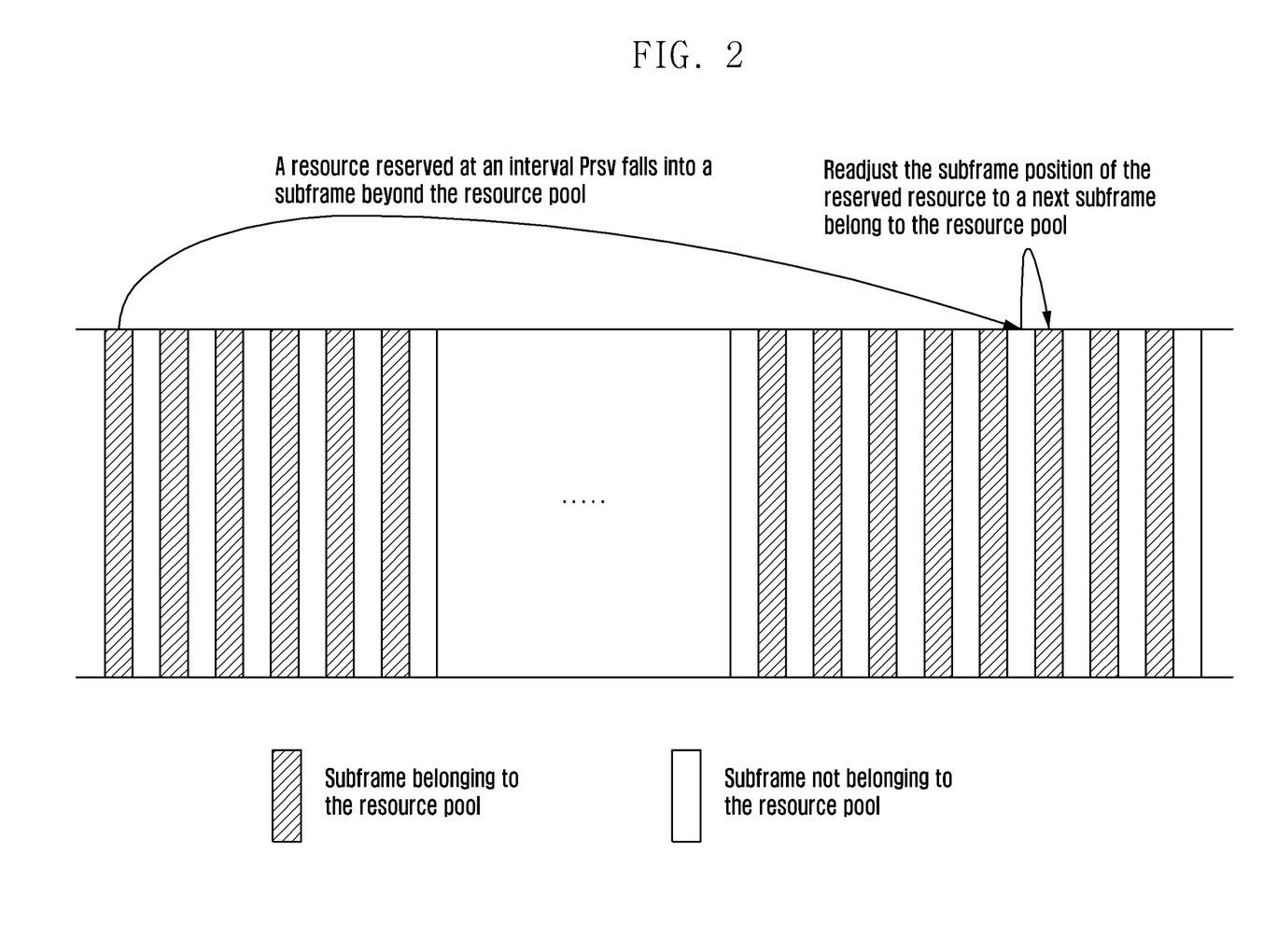
FIG. 2 is a schematic diagram of a first method for adjusting a position of reserved resources according to an embodiment of the present disclosure.

FIG. 2 is a schematic diagram of a first method for adjusting a position of reserved resources according to an embodiment of the present disclosure.

In an embodiment of the present disclosure, during the resource reservation performed by the UE, the resource reservation subframe interval Prsv is independent of the length of a bitmap for configuring a resource pool. If the subframe for a certain resource reserved by the UE at an interval Prsv does not belong to the currently determined resource pool, the UE reselects the subframe position of the reserved resource. The specific implementation operations are as follows.

Referring to FIG. 2, in operation 210, a UE determines a set $\{t_i\}$ composed of configurable V2X subframes within one system frame period.

In an embodiment of the present disclosure, the UE determines the number of configurable V2X subframes according to the configuration of the current carrier, so as to determine the set $\{t_i\}$, the number of subframes in the set $\{t_i\}$ being denoted by M. Wherein, the type of subframes, in one system frame, not belonging to configurable V2X subframes is defined by the standard or configured by an eNB. For example, subframes of this type can comprise subframes for SLSS transmission, downlink subframes on a TDD carrier, or more. Alternatively, subframes of this type only comprise subframes for SLSS transmission.

Operation 220: The UE determines specific information about a bitmap for configuring a resource pool, and determines, in the set $\{t_i\}$, subframes belonging to the resource pool.

In an embodiment of the present disclosure, the UE determines specific information about a bitmap for configuring a resource pool according to the pre-configuration or a configuration signaling of the eNB. The specific information about the bitmap comprises the length B of the bitmap and the specific value of each bit in the bitmap. The procedure for the UE to determine a resource pool according to the bitmap and the set $\{t_i\}$ is the same as the procedure described in the Background.

Operation 230: The UE selects, after resource reselection, the position of a resource for initial transmission, determines, in the resource pool, the subframe position of the reserved resource according to a resource reservation subframe interval Prsv and the number of resource reservations, and readjusts the position of the reserved resource when a certain condition is satisfied.

In an embodiment of the present disclosure, if only a small number of subframes within a system frame period are excluded from the set $\{t_i\}$, for example, if only the subframe for SLSS is excluded, and if there are other subframes that cannot be configured for V2X, those other subframes that cannot be configured for V2X have no influence on the set $\{t_i\}$. Because only a small number of subframes are excluded, and during the resource reservation, although the reservation interval indicates the number of subframes belonging to the set $\{t_i\}$, the number of subframes corresponding to an absolute time of this interval is not much different from the number of subframes in the set $\{t_i\}$ indicated by the reservation interval. In this case, the value of Pm can be determined according to the typical time delay requirements of the V2X data packets. For example, Pm is equal to 100.

In an embodiment of the present disclosure, when the set $\{t_i\}$ is determined, one or more of the following types of subframes can be first excluded, i.e., subframes configured for cell-specific sound reference signal (SRS) transmission; subframes configured for physical random access channel (PRACH) transmission; subframes reserved for physical uplink shared channel (PUSCH) transmission; and TDD downlink subframes and special subframes, on a TDD carrier. Preferably, a part of subframes within the system frame period can be first excluded in one of the following five Methods:

Procedure 1: excluding subframes configured for SLSS transmission within the system frame period, and further excluding TDD downlink subframes and special subframes on a TDD carrier;

Procedure 2: excluding subframes configured for SLSS transmission and subframes configured for cell-specific SRS transmission within the system frame period, and further excluding TDD downlink subframes and special subframes on a TDD carrier;

Procedure 3: excluding subframes configured for SLSS transmission, subframes configured for cell-specific SRS transmission and subframes configured for PRACH transmission within the system frame period, and further excluding TDD downlink subframes and special subframes on a TDD carrier;

Procedure 4: excluding subframes configured for SLSS transmission, subframes configured for cell-specific SRS transmission and subframes reserved for PUSCH transmission within the system frame period, and further excluding TDD downlink subframes and special subframes on a TDD carrier; and Procedure 5: excluding subframes configured for SLSS transmission, subframes configured for cell-specific SRS transmission, subframes configured for PRACH transmission and subframes reserved for PUSCH transmission within the system frame period, and further excluding TDD downlink subframes and special subframes on a TDD carrier.

Wherein, the UE determines the position of a subframe reserved for SLSS transmission by receiving a signaling from an eNB or by pre-configuring or by defining according to the standard. The position of a subframe reserved for PUSCH transmission can be indicated by the eNB by a bitmap, to conveniently ensure the periods of the subframes reserved for PUSCH transmission and ensure the hybrid automatic repeat request round trip time (HARQ RTT) in accordance with PUSCH transmission.

It is assumed that the number of the remaining subframes after the exclusion of this part of subframes is M' and the set formed by this part of subframes is $\{t_{i'}\}$, then Mod(M', B) subframes are further excluded and the remaining subframes form a set $\{t_i\}$. According to this method, it can be determined that the final number M of subframes in the set $\{t_i\}$ can be exactly divided by B. In this way, the change in the period of subframes in the resource pool is avoided when crossing the boundary of the system frame. Wherein, the Mod(M', B) subframes that are further excluded can be distributed in the set $\{t_{i'}\}$ at an equal interval. For example, the Mod(M', B) subframes that are further excluded can be subframes, in the set $\{t_{i'}\}$, having an index value (it refers to a relative index of a subframe in the set $\{t_{i'}\}$) of $\delta+j\times\Delta$, where j=0, 1, 2, ..., Mod(M', B)−1; $\Delta=\lfloor M'/mod(M', B)\rfloor$; and $0\leq\delta<\lfloor M'/mod(M', B)\rfloor$, and a specific value is configured by an eNB, pre-configured or defined by the standard. Alternatively, the Mod(M', B) that are further excluded can be subframes, in the set $\{t_{i'}\}$, having an index value (it refers to a relative index of a subframe in the set $\{t_{i'}\}$) of $\delta+\lfloor j\cdot M'/mod(M',B)\rfloor$, where j=0, 1, 2, ..., Mod(M', B)−1; and $0\leq\delta<\lfloor M'/mod(M',B)\rfloor$, and a specific value is configured by an eNB, pre-configured or defined by the standard. In this way, the case in which the Mod(M', B) subframes that are further excluded are successive in terms of absolute time, which results in too large transmission delay of some V2X data packets, can be avoided.

If a large number of subframes within the system frame period are excluded from the set $\{t_i\}$, and during the resource reservation, the reservation interval indicates the number of subframes belonging to the set $\{t_i\}$, the number of subframes corresponding to the absolute time of this interval may be much greater than the number of subframes in the set $\{t_i\}$ indicated by the reservation interval. Since the typical time delay of V2X data packets is required to be 100 ms, the absolute time corresponding to the reservation interval should be as close as possible to 100 ms. Therefore, in this case, the value of Pm can be adjusted according to the number of subframes excluded from the set $\{t_i\}$ relative to the whole system frame period, to make it less than 100.

According to a first implementation of an embodiment of the present disclosure, the UE determines the value of Pm according to the size M of the set $\{t_i\}$, i.e., $Pm=100\times\lceil M/10240\rceil$ or $Pm=100\times\lfloor M/10240\rfloor$.

According to a second implementation of the present application, $Pm=100\times\lceil$(the number of uplink subframes within one system frame−X)/10$\rceil$ or $Pm=100\times\lfloor$(the number of uplink subframes within one system frame−X)/10$\rfloor$. For example, for an frequency division duplex (FDD) system, if the subframes within the system frame period are excluded in the procedure 1, X=0; if the subframes within the system frame period are excluded in the procedure 2, X is the number of subframes configured for cell-specific SRS transmission within the system frame; if the subframes within the system frame period are excluded in the procedure 3, X is the total number of subframes configured for cell-specific SRS transmission and PRACH transmission within the system frame; if the subframes within the system frame period are excluded in the procedure 4, X is the total number of subframes configured for cell-specific SRS transmission and subframes reserved for PUSCH transmission within the system frame; and, if the subframes within the system frame period are excluded in the procedure 5, X is the total number of subframes configured for cell-specific SRS transmission, subframes configured for PRACH transmission and subframes reserved for PUSCH transmission within the system frame. For example, for a TDD system, procedure 1 is used. For TDD uplink and downlink configuration 2, only ⅓ of subframes are uplink subframes in each system frame. Then, if only TDD downlink subframes, special subframes and subframes configured for SLSS transmission are excluded from the set $\{t_i\}$, the value of Pm is about 20.

According to a third implementation of the present application, the values determined in the first implementation and the second implementation are further adjusted, to make it a multiple or submultiple of B. For example, if the value generated in the first implementation or the second implementation is Pm', according to the value of B, it is determined that $Pm=\alpha\times B$, where $\alpha$ is an integer or a fraction that allows $\alpha\times B$ being not greater than but closest to Pm'. For example, if Pm'=50 while B=16, $\alpha$ should be equal to 3, and Pm=48; and if Pm'=50 while B=100, $\alpha$ should be equal to ½, and Pm=50.

According to a fourth implementation of the present application, $Pm=100\times\lceil(L-X)/L\rceil$ or $Pm=100\times\lfloor(L-X)/L\rfloor$. Here, the number of subframes not configured for V2X transmission within a period of time having a length of L is X. The length L can be a predefined value, or a value configured by a higher-layer signaling, or pre-configured, or determined by the UE. For example, L can be equal to 100. Alternatively, the length L can be determined according to the repetition period of subframes of the types to be excluded when determining the set $\{t_i\}$. For example, for SRS, its period may be 2, 5, 10, 20, 40, 80, 160 or 320 ms; and for PRACH, its period may be 10 ms or 20 ms. For uplink data, it is possible to use a bitmap to configure a bitmap of subframes that can be used for uplink transmission, and the repetition period of the subframes is equal to the length of the bitmap. For example, for FDD, the length of the bitmap is 40. For TDD, the length of the bitmap depends upon the TDD uplink and downlink configuration. For example, for TDD uplink and downlink configuration 0-6, the length of the bitmap can be 70, 20, 20, 20, 20, 20 and 60. X denotes the number of subframes not configured for V2X transmission within a period of time having a length of L. Since there are a small proportion of subframes occupied by SLSS transmission, the subframes for SLSS can be ignored during the calculation of X Alternatively, the subframes for SLSS can also be considered during the calculation of X, for example, L is allowed to be equal to 160 or a multiple of 160. For example, for an FDD system, if the subframes within the system frame period are excluded in the procedure 1, X=0; if the subframes within the system frame period are excluded in the procedure 2, X is the number of subframes configured for cell-specific SRS transmission within the system frame; if the subframes within the system frame period are excluded in the procedure 3, X is the total number of subframes configured for cell-specific SRS transmission and PRACH transmission within the system frame; if the subframes within the system frame period are excluded in the procedure 4, X is the total number of subframes configured for cell-specific SRS transmission and subframes reserved for PUSCH transmission within the system frame; and, if the subframes within the system frame period are excluded in the procedure 5, X is the total number of subframes configured for cell-specific SRS transmission, subframes configured for PRACH transmission and subframes reserved for PUSCH transmission within the system frame. For example, for a TDD system, procedure 1 is used. For TDD uplink and downlink configuration 2, only ⅕ of subframes are uplink subframes in each system frame. Then, if only TDD downlink subframes, special subframes and subframes configured for SLSS transmission are excluded from the set $\{t_i\}$, the value of Pm is about 20.

According to one method of the present application, if the UE performs resource reselection on the subframe n, the UE performs channel detection (for example, detecting a physical sidelink shared channel-reference signal receive power (PSSCH-RSRP) and sidelink-received signal strength indicator (S-RSSI)) on subframes $t_{n'-a-b+1}$, $t_{n'-a-b}$, . . . , $t_{n'-b}$, except subframes that transmit a sidelink signal by themselves. Wherein, if the subframe n belongs to the set $\{t_i\}$, n' denotes a relative index of the subframe n within the set $\{t_i\}$; and if the subframe n does not belong to the set $\{t_i\}$, n' denotes a relative index of a first subframe belonging to the set $\{t_i\}$ after the subframe n within the set $\{t_i\}$. a=I×Pm denotes the maximum reservation period supported by the current carrier, and the value of b is defined by the standard, for example, b=1 or b=2. In this case, the resource selection window of the UE should be [n+T$_1$, n+T$_2$], where the values of T$_1$ and T$_2$ are determined by the UE, and the absolute time between the subframe corresponding to n+T$_1$ and the subframe corresponding to n should be not greater than 4 ms; 20×P$_m$/100≤T$_2$≤P$_m$, the selection of T$_2$ by the UE should meet the time delay requirements of vehicle to vehicle (V2V) data packets. The value of I is defined according to the standard definition, or is configured by the eNB or preconfigured, for example, I=10. It is to be noted that, except for the subframe n, subframes mentioned here are subframes in the set $\{t_i\}$.

According to another method of the present application, if the UE performs resource reselection on a subframe n, the UE performs channel detection (for example, detecting a PSSCH-RSRP and S-RSSI) on subframes belonging to the set $\{t_i\}$ within a range $[t_{I\times Pm-1}, t_0]$ except subframes that transmit a sidelink signal by themselves. Alternatively, the UE performs channel detection (for example, detecting a S-RSSI) on subframes belonging to the current resource pool in which the UE runs within a range $[n-t_{(I\times Pm-1)}, n-t_0]$ except subframes that transmit a sidelink signal by themselves. Wherein, if the subframe n belongs to the set $\{t_i\}$, $t_0$=n; and if the subframe n does not belong to the set $\{t_i\}$, $t_0$ denotes an index of a first subframe belonging to the set $\{t_i\}$ in the whole system frame period before the subframe n, and $t_{(I\times Pm-1)}$ denotes an index of a (I×Pm)$^{th}$ subframe belonging to the set $\{t_i\}$ in a whole system frame period before the subframe n.

According to yet another method of the present application, if the UE performs resource reselection on a subframe n, the UE performs channel detection (for example, detecting a PSSCH-RSRP and S-RSSI) on subframes belonging to the set $\{t_i\}$ within a range $[t_{I\times Pm-1}, n-1]$ except subframes that transmit a sidelink signal by themselves. Alternatively, the UE performs channel detection (for example, detecting a S-RSSI) on subframes belonging to the current resource pool in which the UE runs within a range $[n-t_{(I\times Pm-1)}, n-1]$ except subframes that transmit a sidelink signal by themselves. Wherein, $t_{(I\times Pm-1)}$ denotes an index of a (I×Pm)$^{th}$ subframe belonging to the set $\{t_i\}$ in the whole system frame period before the subframe n.

According to still another method of the present application, if the UE performs resource reselection on a subframe n, the UE performs channel detection (for example, detecting a PSSCH-RSRP and S-RSSI) on subframes belonging to the set $\{t_i\}$ within a range [n−D, n−1] except subframes that transmit a sidelink signal by themselves. Alternatively, the UE performs channel detection (for example, detecting a PSSCH-RSRP and S-RSSI) on subframes belonging to the current resource pool in which the UE runs within a range [n−D, n−1] except subframes that transmit a sidelink signal by themselves. The value of D is defined according to the standard definition, for example, D=1000.

If a UE physical layer receives a PSSCH scheduling grant from a UE higher layer, the PSSCH scheduling grant schedules a PSSCH frequency-domain resource set s on a subframe $t_n$ for current TB transmission, and the resource reservation subframe interval is Prsv; if the UE determines, according to the number of resource reservations indicated by the PSSCH scheduling grant, that a subframe m for the j$^{th}$ resource reservation does not belong to the resource pool determined in operation 220, or if only subframes for SLSS transmission are excluded from the set $\{t_i\}$ and the subframe m is a TDD downlink subframe or a subframe of other types unavailable for V2X transmission although it belongs to the resource pool determined in operation 220, the UE readjusts the subframe position of the reserved resource at this time in one or more of the following three methods:

Procedure 1: the UE adjusts the position of the j$^{th}$ reserved resource to a first subframe belonging to the current resource pool after the subframe m, as shown in FIG. 2, and regards a same frequency-domain resources set s on this subframe as an available PSSCH transmission resource;

Procedure 2: the UE adjusts the position of the j$^{th}$ reserved resource to a first subframe belonging to the current resource pool before the subframe m, and regards a same frequency-domain resources set s on this subframe as an available PSSCH transmission resource; and Procedure 3: the UE randomly selects a subframe belonging to the current resource pool within a range of subframes [m+x,m+y], and regards a same frequency-domain resources set s on this subframe as an available PSSCH transmission resource, where all subframes within the range [m+x,m+y] belong to a same system frame period, both x and y are integers and can be negative values, and the specific values of x and y are determined by the UE.

Operation 240: The UE transmits a PSSCH on the determined resource for initial transmission and on the reserved resource.

In an embodiment of the present disclosure, a part of subframes in the resource pool can be configured as transmission intervals, and the UE determines the position of the subframes serving as the transmission intervals by receiving a signaling from the eNB or by pre-configuring. If a subframe for a PSSCH transmission resource currently selected by the UE belongs to a transmission interval, and an uplink data center interconnection (DCI) received by the UE indicates that the UE needs to transmit a PUSCH on this subframe, the UE should preferentially transmit the PUSCH and give up transmitting the PSSCH. On the contrary, if a subframe for a PSSCH transmission resource currently selected by the UE does not belong to a transmission interval, and an uplink DCI received by the UE indicates that the UE needs to transmit a PUSCH on this subframe, the UE should preferentially guarantee to transmit the PSSCH and give up transmitting the PUSCH.

It is to be specifically noted that the UE can determine the priority of channels according to the rules described in operation 240, when all sidelink channels and PUSCHs are transmitted simultaneously.

So far, an embodiment ends. By the method of an embodiment of the present disclosure, if a subframe reserved by the UE according to a resource reservation subframe interval indicated by a higher layer does not belong to the current source pool, the UE can readjust the position of the reserved resource to a nearest subframe belonging to the current source pool which is before or after the reserved resource, or to a subframe belonging to the current source pool which is determined randomly within a certain range. By this method, the alteration to the existing standard is minimized.

Embodiment 2

Figure 3:
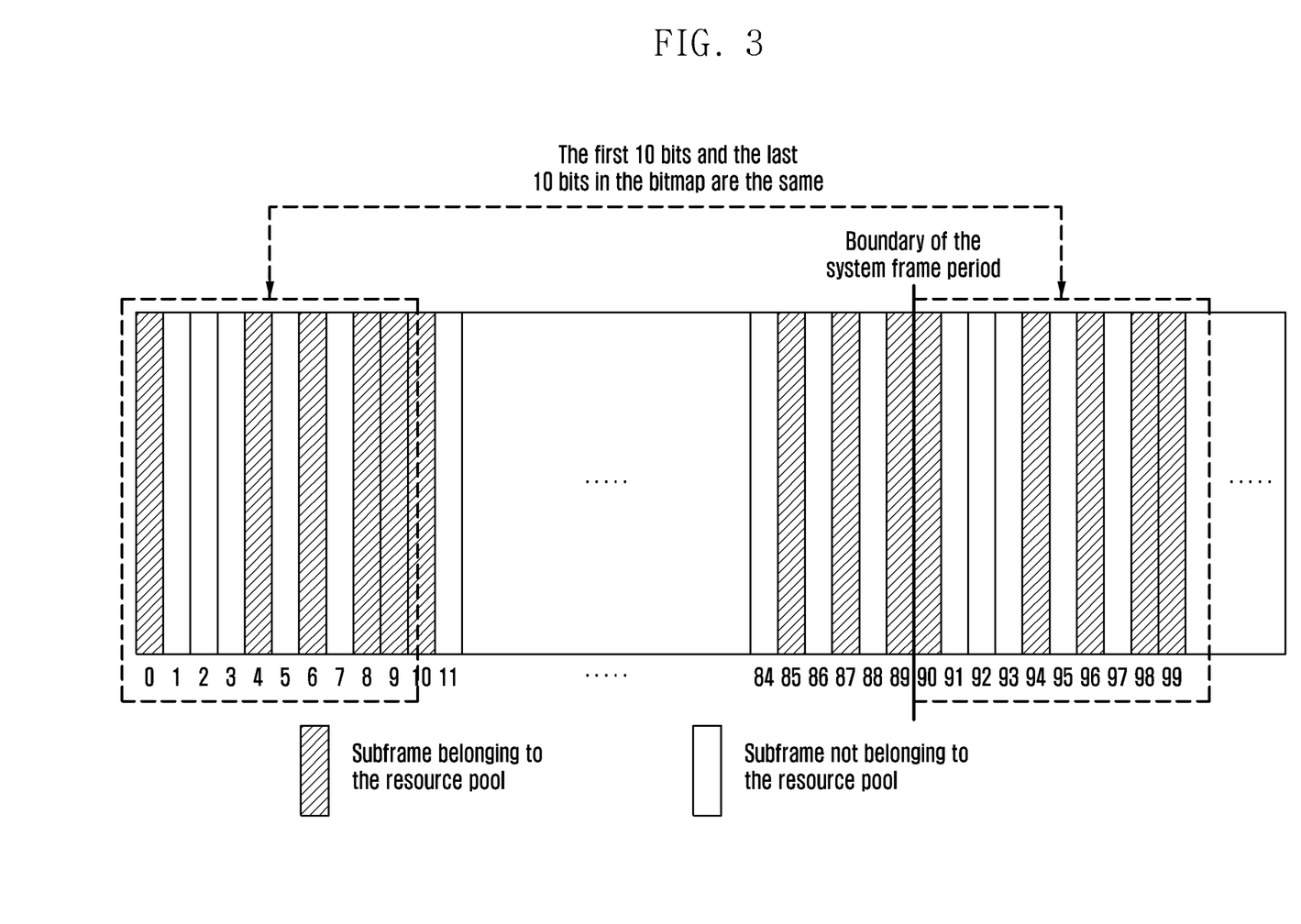
FIG. 3 is a schematic diagram of features of a bitmap for configuring a resource pool according to an embodiment of the present disclosure.

FIG. 3 is a schematic diagram of features of a bitmap for configuring a resource pool according to an embodiment of the present disclosure.

Referring to FIG. 3, in an embodiment of the present disclosure, during the resource reservation performed by the UE, the granularity Pm of the resource reservation subframe interval can be related to the length B of a bitmap for configuring a resource pool. Specifically, the value of Pm is an integral multiple of B. Thus, it is ensured that a subframe for a resource reserved by the UE according to any one resource reservation subframe interval Prsv belongs to the current resource pool of the UE. In addition, in each system frame, a bitmap mapping offset specific to the current system frame period is introduced, and bits, in the bitmap, corresponding to the offset are mapped onto subframes in the set $\{t_i\}$ within the system frame. The specific implementation operations are as follows.

Operation 310: A UE determines a set $\{t_i\}$ of configurable V2X subframes within one system frame period.

In an embodiment of the present disclosure, the UE first determines the number of configurable V2X subframes according to the configuration of the current carrier, so as to determine the set $\{t_i\}$, the number of subframes in the set $\{t_i\}$ being denoted by M. Wherein, the type of subframes, in one system frame, not belonging to configurable V2X subframes is defined by the standard or configured by an eNB. For example, subframes of this type can comprise subframes for SLSS transmission, downlink subframes on a TDD carrier, or more. Alternatively, subframes of this type only comprise subframes for SLSS transmission.

Operation 320: The UE determines specific information about a bitmap for configuring a resource pool, and determines, in the set $\{t_i\}$, subframes belonging to the resource pool.

In an embodiment of the present disclosure, the UE determines specific information about a bitmap for configuring a resource pool according to the pre-configuration or a configuration signaling of the eNB. The specific information of the bitmap comprises the length B of the bitmap and the specific value of each bit in the bitmap.

In an embodiment of the present disclosure, on the boundary of the system frame period, a part of bits in the bitmap for configuring the resource pool will go beyond the current system frame period. Therefore, according to one implementation of the present application, the procedure for the UE to determine a resource pool according to the bitmap and the set $\{t_i\}$ is the same as the procedure described in the Background. For example, within each system frame period, bits in the bitmap, starting from the zeroth bit, are mapped onto subframes in the set $\{t_i\}$ within the system frame. According to this implementation, after crossing the system frame period, the distribution period of subframes in the resource pool change. In order to address this issue, preferably, the first B-mod(M,B) bits in the bitmap for configuring the resource pool should be the same as the last B-mod(M,B) bits in the bitmap. For example, for bit $b_l$ having an index value of l in the bitmap, where $l \in [0, B\text{-mod}(M,B))$, $b_l = b_{l+B\text{-mod}(M,B)}$ should be satisfied, as shown in FIG. 3.

According to another implementation of an embodiment of the present disclosure, within each system frame period, the bitmap for configuring the resource pool is mapped onto subframes in the set $\{t_i\}$ within the system frame period according to the bitmap mapping offset specific to the system frame. Specifically, it is assumed that the universal time coordinated (UTC) of the current moment is t, starting from the $(\Delta_t)^{th}$ bit, the bitmap is mapped onto subframes belonging to the set $\{t_i\}$ within the system frame. $\Delta_t$ denotes the bitmap mapping offset used by the current system frame period, indicating the number of bits not mapped onto subframes during the last bitmap mapping of the previous system frame period, where $\Delta_t = \text{mod}(\lfloor(t-T_{ref})/10.24\rfloor \times M, B)$, $T_{ref}$ denotes a particular UTC reference time point. Wherein, the UE can determine the UTC reference point by defining according to the standard or by pre-configuration. For example, the UTC reference point can be pre-configured or defined according to the standard as greenwich mean time (GMT) 00:00:00 on Jan. 1, 1900, or the UTC reference point can be determined by receiving a signaling of the eNB. According to this implementation, for any subframe $t_j$ in the set $\{t_i\}$, if the $(\text{mod}(j+\Delta_t, B))^{th}$ bit in the bitmap is 1, it is indicated that the subframe $t_j$ belongs to the resource pool configured by the bitmap. Preferably, if a UE determining $\Delta_t$ in this way transmits a physical sideline broadcast channel (PSBCH), the UE should transmit the value of $\Delta_t$ within the current system frame period in the PSBCH.

According to still another implementation of an embodiment of the present disclosure, if the UE can determine a UTC reference time point on the current carrier, the UE uses the particular UTC reference time point as a starting point for calculating the first system frame of the current carrier. The bitmap for configuring the resource pool, after repetition, is successively mapped onto the subsequent configurable V2X subframes, starting from the first configurable V2X subframe following this reference point. Specifically, for any subframe $t_j$ in the set $\{t_i\}$ within the current system frame period, if the $(\text{mod}(\lfloor(t-T_{ref})/10.24\rfloor \times M+j, B))^{th}$ bit in the bitmap is 1, it is indicated that the subframe $t_j$ belongs to the resource pool configured by the bitmap. Or otherwise, it is indicated that the subframe $t_{ref}$ does not belong to the resource pool. Wherein, t denotes the UTC time of the current moment, and $T_{ref}$ denotes a particular UTC reference time point. The UE can determine the UTC reference point by defining according to the standard or by pre-configuration. For example, the UTC reference point can be pre-configured or defined according to the standard as GMT 00:00:00 on Jan. 1, 1900, or the UTC reference point can be determined by receiving a signaling of the eNB.

According to still another implementation of an embodiment of the present disclosure, a synchronization source transmits the bitmap mapping offset used by the current system frame period through a signaling, and the synchronization source comprises an eNB or a UE transmitting a synchronization signal. It is assumed that the UTC time of the current time is t, the UE maps, starting from the $(\tilde{\Delta}_t)^{th}$ bit, the bitmap onto subframes belonging to the set $\{t_i\}$ within the system frame, where $\tilde{\Delta}_t = \mathrm{mod}(\mathrm{mod}(\lfloor (t-\tilde{T}_{ref})/10.24 \rfloor \times M, B) + A, B)$, $\tilde{T}_{ref}$ denotes the UTC time when the UE receives a signaling indicative of the bitmap mapping offset from a synchronization source the last time, and A is the bitmap mapping offset indicated by the synchronization source received by the UE the last time. According to this implementation, for any subframe $t_j$ in the set $\{t_i\}$, if the $(\mathrm{mod}(j+\Delta_t, B))^{th}$ bit in the bitmap is 1, it is indicated that the subframe $t_j$ belongs to the resource pool configured by the bitmap. Preferably, if a UE determining $\Delta_t$ in this way transmits a PSBCH, the UE should transmit the value of $\Delta_t$ within the current system frame period in the PSBCH.

Operation 330: The UE selects, after resource reselection, the position of a resource for initial transmission, determines, in the resource pool, the subframe position of the reserved resource according to a resource reservation subframe interval Prsv and the number of resource reservations, and readjusts the position of the reserved resource when a certain condition is satisfied.

In an embodiment of the present disclosure, if only a small number of subframes within a system frame period are excluded from the set $\{t_i\}$, for example, if only the subframe for SLSS is excluded, and if there are other subframes that cannot be configured for V2X, those other subframes that cannot be configured for V2X have no influence on the set $\{t_i\}$. Because only a small number of subframes are excluded, and during the resource reservation, although the reservation interval indicates the number of subframes belonging to the set $\{t_i\}$, the number of subframes corresponding to an absolute time of this interval is not much different from the number of subframes in the set $\{t_i\}$ indicated by the reservation interval. In this case, the value of Pm can be determined according to the typical time delay requirements of the V2X data packets, and should be an integral multiple of B. For example, Pm is equal to 98.

In an embodiment of the present disclosure, if a large number of subframes within the system frame period are excluded from the set $\{t_i\}$, for example, subframes for SLSS and TDD downlink subframes are both excluded. In addition, after such a large number of subframes are excluded from the set $\{t_i\}$, there may be other subframes that cannot be configured for V2X, and those other subframes that cannot be configured for V2X have no influence on the set $\{t_i\}$. Because a large number of subframes are excluded, and during the resource reservation, the reservation interval indicates the number of subframes belonging to the set $\{t_i\}$, the number of subframes corresponding to the absolute time of this interval may be much greater than the number of subframes in the set $\{t_i\}$ indicated by the reservation interval. Since the typical time delay of V2X data packets is required to be 100 ms, the absolute time corresponding to the reservation interval should be as close as possible to 100 ms. In addition, the reservation interval should be an integral multiple of B. Therefore, in this case, the value of Pm can be adjusted according to the number of subframes excluded from the set $\{t_i\}$ relative to the whole system frame period. For example, for TDD uplink and downlink configuration 2, only ⅕ of subframes are uplink subframes. Then, if TDD downlink subframes are excluded from the set $\{t_i\}$, the value of Pm is about 48. The UE can determine the specific correspondence between Pm and the number of subframes to be excluded from the set $\{t_i\}$, by receiving the configuration of the eNB or by pre-configuration In an embodiment of the present disclosure, the granularity Pm of the resource reservation subframe interval can be related to the value of B. Preferably, the value of Pm should be an integer, closest to 100, which can be exactly divided by B. For example, if B=16, Pm=96; and if B=20 or 100, Pm=100.

If a UE physical layer receives a PSSCH scheduling grant indicted by a UE higher layer, the PSSCH scheduling grant schedules a PSSCH frequency-domain resource set s on a subframe $t_n$ for current TB transmission, and the resource reservation subframe interval is Prsv; if the UE determines, according to the number of resource reservations indicated by the PSSCH scheduling grant, that a subframe m for the $j^{th}$ resource reservation does not belong to the resource pool determined in operation 320, or if only subframes for SLSS transmission are excluded from the set $\{t_i\}$ and the subframe m is a TDD downlink subframe or a subframe of other types unavailable for V2X transmission although it belongs to the resource pool determined in operation 220, the UE readjusts the subframe position of the reserved resource in a way the same as that in Embodiment 2.

Operation 340: The UE transmits a PSSCH on the determined resource for initial transmission and on the reserved resource.

In an embodiment of the present disclosure, a part of subframes in the resource pool can be configured as transmission intervals, and the UE determines the position of the subframes serving as the transmission intervals by receiving a signaling from the eNB or by pre-configuration. If a subframe for a PSSCH transmission resource currently selected by the UE is a transmission interval, and an uplink DCI received by the UE indicates that the UE needs to transmit a PUSCH on this subframe, the UE should preferentially transmit the PUSCH and give up transmitting the PSSCH. On the contrary, if a subframe for a PSSCH transmission resource currently selected by the UE is not a transmission interval, and an uplink DCI received by the UE indicates that the UE needs to transmit a PUSCH on this subframe, the UE should preferentially transmit the PSSCH and give up transmitting the PUSCH.

So far, an embodiment ends. By the method of an embodiment of the present disclosure, the granularity Pm of the resource reservation subframe interval is an integral multiple of the length of the bitmap for configuring the resource pool. Therefore, it is ensured that the subframe for the reserved source will not go beyond the subframes contained in the resource pool. In addition, by the introduction of the bitmap mapping offset specific to the system frame, it is ensured that the period of subframes in the resource pool will not change after crossing the boundary of the system frame. In the above two ways, it can be ensured that the reserved resource for the UE is always a subframe belonging to the resource pool.

Figure 4:
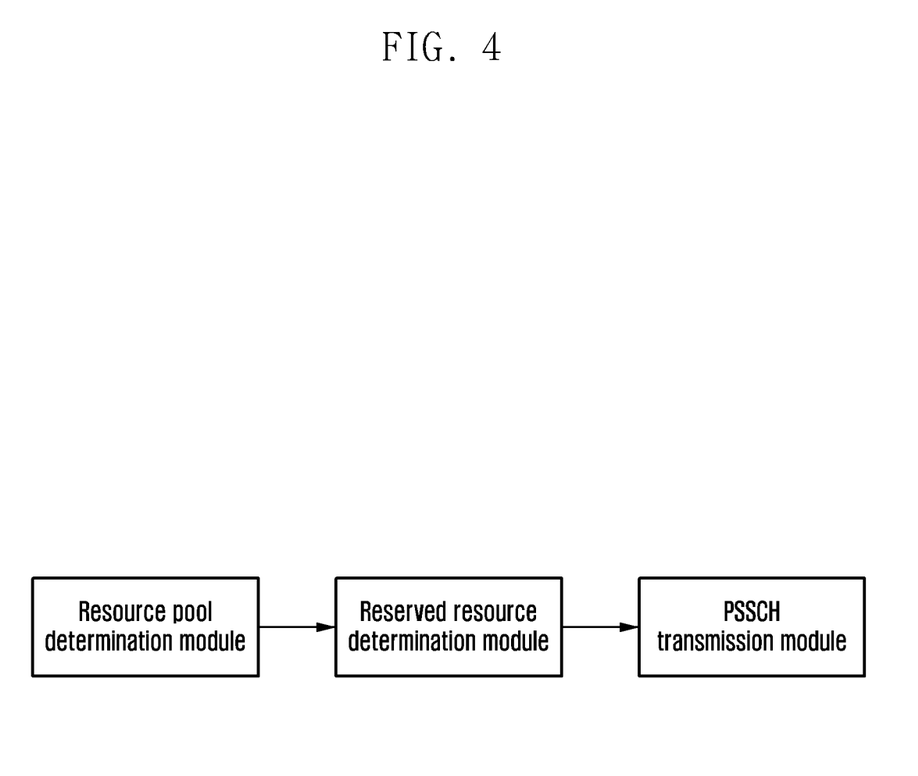
FIG. 4 is a schematic diagram of an equipment for determining transmitting resources according to an embodiment of the present disclosure.

FIG. 4 is a schematic diagram of an equipment for determining transmitting resources according to an embodiment of the present disclosure.

The present application further discloses an equipment for determining transmitting resources in V2X communication, the structure of which is shown in FIG. 4.

Referring to FIG. 4, the equipment comprises a resource pool determination module, a reserved resource determination module and a PSSCH transmission module.

The resource pool determination module is configured to determine a set $\{t_i\}$ of configurable V2X subframes and determine subframes contained in a resource pool in the set $\{t_i'\}$ according to a bitmap for configuring the resource pool.

The reserved resource determination module is configured to select, after resource reselection, the position of a resource for initial transmission, determine, in the resource pool, the subframe position of the reserved resource according to a resource reservation subframe interval Prsv and the number of resource reservations, and readjusts the position of the reserved resource when a certain condition is satisfied.

The PSSCH transmission module is configured to transmit a PSSCH on the resource for initial transmission and on the reserved resource.

It can be understood by a person of ordinary skill in the art that all of or a part of operations in the embodiment methods can be implemented by instructing related hardware by programs. The programs can be stored in a computer-readable storage medium, and, when executed, include one or a combination of the operations of the method various embodiments.

In addition, each functional unit in each embodiment of the present application can be integrated into a processing module. Alternatively, each unit can exist alone physically. Alternatively, two or more units can be integrated into one module. The integrated module can be implemented in the form of hardware, or can be implemented in the form of a software functional module. If the integrated module is implemented in the form of a software functional module and sold or used as an independent product, the integrated module can also be stored in a computer-readable storage medium.

The storage medium can be a read-only memory, a magnetic disk, an optical disk, and the like.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by a terminal for transmitting data for sidelink communication, the method comprising:
   receiving, from a base station, configuration information including information on a bitmap associated with a sidelink resource pool for the sidelink communication;
   identifying a time resource set that includes all time resources except for excluded time resources, wherein the excluded time resources include time resources for sidelink synchronization signal, time resources that are not configured for uplink transmission, and reserved time resources; and
   determining the sidelink resource pool based on the time resource set and the configuration information.

2. The method of claim 1, wherein the reserved time resources are determined based on a length of the bitmap and a modulo function.

3. The method of claim 1, further comprising:
   selecting time resources for initial transmission from the time resource set;
   transmitting a physical sidelink control channel (PSCCH) including information on the selected time resources; and
   transmitting a physical sidelink shared channel (PSSCH) based on the selected time resources.

4. The method of claim 1, wherein an interval of a resource reservation is used to select resources for the sidelink communication in the sidelink resource pool, and
   wherein the interval of the resource reservation is equal to 100 ms or less than 100 ms.

5. The method of claim 1, wherein the configuration information includes resource block information.

6. The method of claim 5, wherein the sidelink resource pool is determined, additionally, based on the resource block information.

7. A terminal for transmitting data for sidelink communication, the terminal comprising:
   a transceiver; and
   a controller coupled with the transceiver and configured to:
      receive, from a base station, configuration information including information on a bitmap associated with a sidelink resource pool for the sidelink communication,
      identify a time resource set that includes all time resources except for excluded time resources, wherein the excluded time resources include time resources for sidelink synchronization signal, time resources that are not configured for uplink transmission, and reserved time resources, and
      determine the sidelink resource pool based on the time resource set and the configuration information.

8. The terminal of claim 7, wherein the reserved time resources are determined based on a length of the bitmap and a modulo function.

9. The terminal of claim 7, wherein the controller is configured to:
   select time resources for initial transmission from the time resource set,
   transmit a physical sidelink control channel (PSCCH) including information on the selected time resources, and
   transmit a physical sidelink shared channel (PSSCH) based on the selected time resources.

10. The terminal of claim 7, wherein an interval of a resource reservation is used to select resources for the sidelink communication in the sidelink resource pool, and
    wherein the interval of the resource reservation is equal to 100 ms or less than 100 ms.

11. The terminal of claim 7, wherein the configuration information includes resource block information.

12. The terminal of claim 11, wherein the sidelink resource pool is determined, additionally, based on the resource block information.

* * * * *